United States Patent

[11] 3,584,138

[72] Inventor Douglas T. Pritzen, Jr.
Moss Beach, Calif.
[21] Appl. No. 883,845
[22] Filed Dec. 10, 1969
[45] Patented June 8, 1971
[73] Assignee Westinghouse Electric Corporation
Pittsburgh, Pa.

[54] BUS DUCT INCLUDING IMPROVED HOUSING
12 Claims, 8 Drawing Figs.
[52] U.S. Cl. .................................................. 174/68,
174/99
[51] Int. Cl. ...................................................... H02g 5/06
[50] Field of Search ........................................ 174/16 B,
71 B, 72 B, 88 B, 99 B, 68 B, 133 B, 129 B; 339/22 B

[56] References Cited
UNITED STATES PATENTS
3,088,994  5/1963  Cataldo .................... 174/99 B
3,099,504  7/1963  Rowe ....................... 174/99BX Primary Examiner—Darrell L. Clay
Attorneys—A. T. Stratton and Clement L. McHale ABSTRACT: A section of bus duct comprising insulated bus bars in an aluminum housing at least part of which is extruded completely enclosing the bus bars supporting them and acting as a heat dissipating means for the bus bars.

PATENTED JUN 8 1971

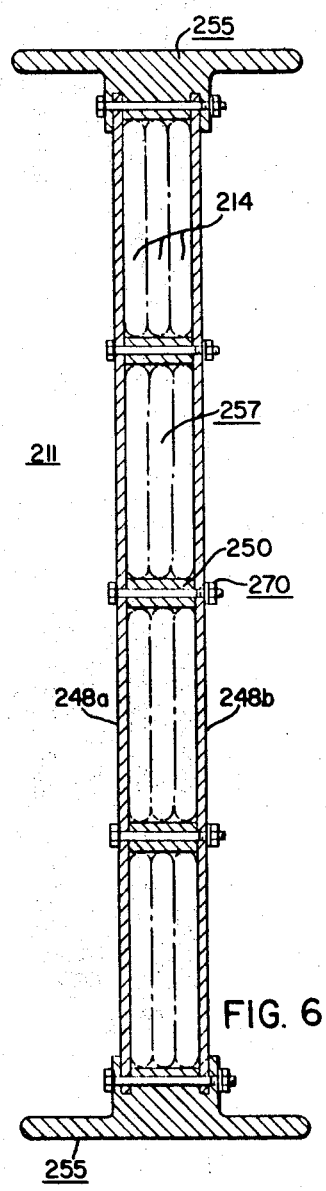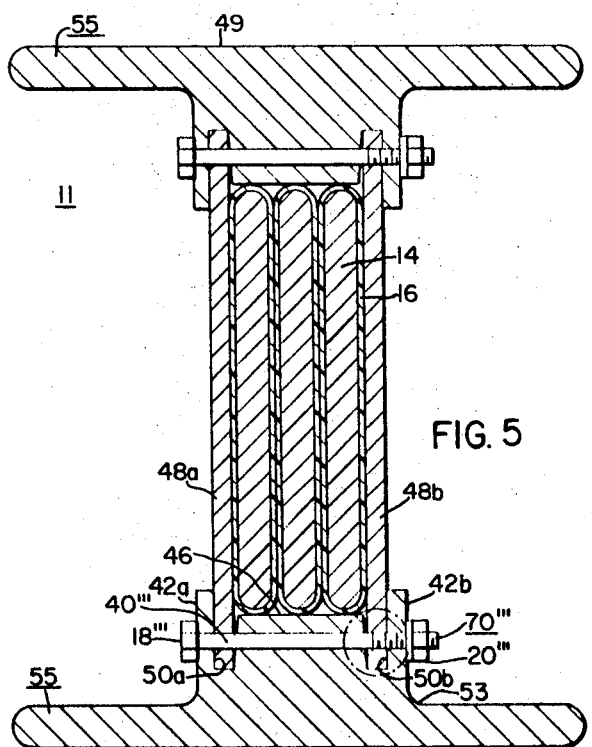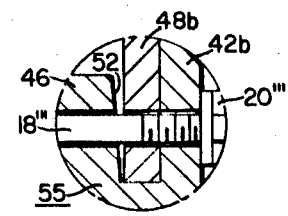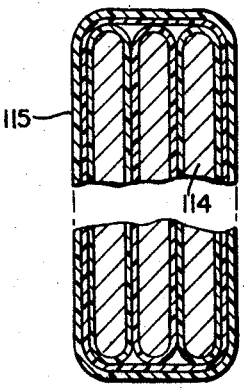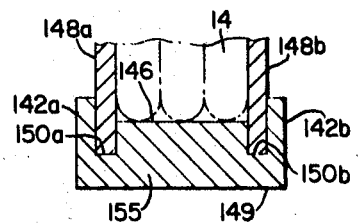

BUS DUCT INCLUDING IMPROVED HOUSING

BACKGROUND OF THE INVENTION

This invention relates to electrical bus duct and in particular to electrical bus duct of the totally enclosed type.

In the past, bus duct of the enclosed type included a plurality of assembled housing sections for enclosing associated insulated conductors with the housing sections normally including vent passages or openings. The purpose of the vent passages in the housing means was to prevent the buildup of heat resulting from the passage of relatively high amount of electrical current through the electrical bus bars and to limit the temperature rises during the operation of such equipment. For reasons of safety, to isolate or to protect the bus bars from dirt or a corrosive environment, different bus duct structures have been proposed to totally enclose bus bars by eliminating the vents passages or openings of such bus ducts.

A problem arises in dissipating the heat which results during the operation of such totally enclosed bus duct structures. It is known in such applications to use combinations of steel and aluminum sections for the housing. The housing totally encloses the associated bus bars and is mounted in physical contact with the insulation on the bus bars so as to provide a conduction path for the heat which is generated during operation. An example of this is disclosed in U.S. Pat. Reissue 26,310 by E. W. Moodie et al. which was reissued Nov. 28, 1967. Structures of this type normally require at least four sections of housing certain of which are steel for rigidity and certain of which are aluminum for heat conduction.

The structural complexity of housings having multiple housing sections makes it a difficult task to assemble such bus duct housing. Often the different housing sections are not congruent or identical and therefore are not of the same material thus requiring utilization of material stock from a number of different types of inventories. In addition, because of the multiplicity of pieces necessary to enclose the bus duct, more securing means are necessary than would be if the housing were simpler in construction. Since the housing means are made of steel for structural strength, the heat-conducting efficiency of the overall housing is less than that of a completely aluminum housing structure. In addition, since steel is more rigid than aluminum, in applications where it is desirable that the housing sections flex or bend during operation it is very difficult to get a completely sealed bus duct without the use of gaskets because of the inability of the steel to flex and bend when the securing means is applied. For the same reasons it is difficult to achieve the required pressure of the housing sections against the electrical conductors so that the housing may function as an efficient heat-sink or heat-dissipating means.

SUMMARY OF THE INVENTION

In accordance with the invention, a housing means is provided for totally enclosing bus duct. In one embodiment the housing means comprises a pair of extruded pieces or housing sections which are congruent with respect to each other and are cut from the same piece or stock of material. These housing sections are joined together by a suitable securing means and the securing means is adjusted so that the housing sections compress or contact the enclosed insulated bus bars and at the same time form a flush joint with each other to provide a complete enclosure for the associated bus bars. The bus duct housing is made substantially entirely of aluminum or a suitable aluminum alloy thus providing for efficient transfer of heat from the bus bars or conductors through the housing and into the atmosphere. Extruded housing sections are shaped to give added structural strength to the bus duct structure and to eliminate the need for rigid steel members.

In a second embodiment, a four-piece bus duct housing includes sheet aluminum sides and extruded aluminum tops and bottoms. This embodiment provides the efficient heat transferring advantages of an entirely aluminum section, and still retains structural rigidity because of the extruded shape of the aluminum housing portions. In addition, securing means are mounted and adjusted in such a way that parts of the oppositely disposed extruded sections are deformed into the sheet metal sections forming a good seal between the assembled parts. In turn, the sheet metal sections are forced against the insulated bus bars providing an efficient heat sink or heat-dissipating means.

Both embodiments of the invention may be employed in conjunction with multiple bus runs disposed within the same housings.

It therefore is an object of this invention to provide a more efficient means for removing heat from insulated bus bars while at the same time providing a simple housing construction easy to assemble and ruggedly rigid in its construction. One of the advantages of this type of construction is that it is capable of completely enclosing the associated bus bars thus providing for a safer means of transmitting electrical power as well as sealing out dirt and corrosive atmosphere.

BRIEF DESCRIPTION OF THE DRAWING

Other objects of the invention will be apparent from the following detailed description taken in conjunction with the accompanying drawing, in which:

FIG. 1b is a cross-sectional view of a section of insulated bus bars with the insulation enclosing individual bus bars and the combination of bus bars;

FIG. 4 is a partial sectional view of a generally E-shaped extruded aluminum housing section and associated aluminum sheet sides;

FIG. 5 is a sectional view similar to FIG. 4 except that the E-shaped section of extruded aluminum is distorted or deformed slightly by enlargement to give better heat distribution properties;

FIG. 5a, an insert view, is provided with the special camber on one part of the extruded aluminum section to aid in acquiring a tight pressure fit;

FIG. 6 is a sectional view similar to FIG. 5 except that a plurality of stacked insulated multiple runs of bus ducts is provided.

DESCRIPTION OF THE PREFERRED EMBODIMENTS

Figure 1:
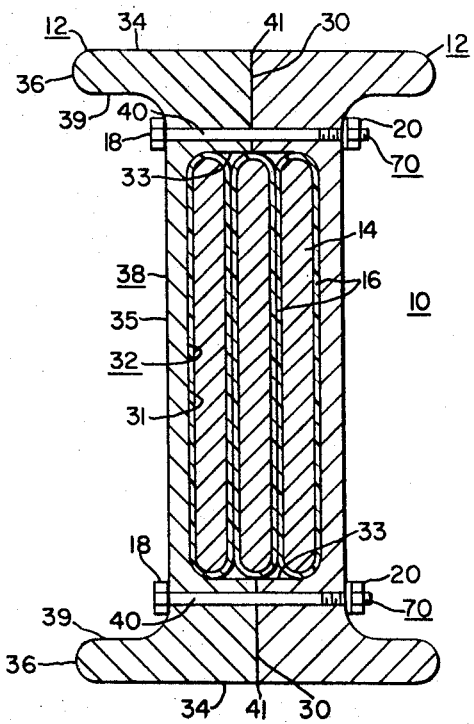
FIG. 1 is a cross-sectional view of a section of totally enclosed bus duct including extruded aluminum housing members.

Referring to the drawings and in particular to FIG. 1, one embodiment of the invention is shown, in which a section of bus duct housing 10 comprising bus bars 14 is totally enclosed by a pair of extruded heat-conducting aluminum housing members or housings 12. Each housing member or section 12 forms one-half of the total housing means and is congruent or identical with the other associated housing section. Each housing member 12 generally is I-shaped. More specifically, viewing the left housing member, one side 30 of each housing member 12, which is preferably formed from extruded aluminum, includes a generally U-shaped depression or recess 32 formed into it. U-shaped depression 32 which opens outwardly in a first direction and includes a bottom portion 31 and two end portions 33 which are disposed generally perpendicular to the side 30 and terminate at it. On the opposite side of each housing member 12 facing away from U-shaped depression or recess 32 is a second U-shaped recess or depression 38. U-shaped depression 38 has a bottom portion 35 joined to end portions 39 which are generally perpendicular to the bottom portion 35 and which terminate at a connecting portion 36. Connecting portion 36 connects the ends 39 of each U-shaped depression 38 with a pair of generally parallel edges 34 of the housing member 12. These edges 34 are generally perpendicular to the aforementioned side 30 and complete the perimeter of housing section 12.

A section of bus duct 10 is formed by placing sections of copper or aluminum bus bars or conductors 14 having insulation 16 disposed thereon and assembled or disposed closely together in a parallel face-to-face and side-by-side relationship within the joined associated extruded aluminum housing members 12. The extruded housing members 12 are assembled or joined face-to-face with respect to each other and drawn together by transversely oriented securing or fastening means 70 to enclose insulated bus bars 14. The securing means 70 which may consist of bolt 18 and nut 20 and may be disposed in each of the openings 40 of the bus duct housing member 12 draws the housing members 12 against the insulated bars 14 to thereby form the substantially sealed joints indicated at 41. At this point in the assembly the bus bars 14 are substantially enclosed.

Figure 2:
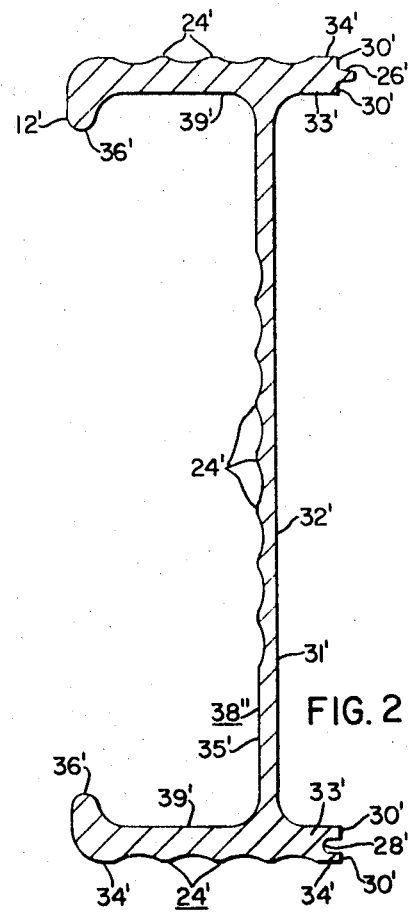
FIG. 2 is a view of one section of an extruded aluminum housing member.

Referring to FIG. 2 a single housing member 12 similar to housing member 12 shown in FIG. 1 is shown, which may be employed in the bus duct structure 10 of FIG. 1. One side 30' of the housing member 12' includes a generally U-shaped central depression or recess 32'. The U-shaped recess 32' includes a bottom portion 31' at substantially right angles to end sections 33'. The oppositely disposed U-shaped recess 38' includes a bottom portion 35' and perpendicular end portions 39' which terminate at the connecting portions 36' which in turn connect with the oppositely disposed generally parallel edges 34'. Surface undulations or corrugations 24' on both top and bottom edges 34' and vertical bottom portions 35' are provided to increase surface area to allow heat to be dissipated more quickly and more efficiently from the aluminum housing section 12'. Note that side 30' includes two portions, a top and bottom. The top part of side 30' (above the U-shaped depression 32') supports a protrusion or projecting portion 26', while the bottom portion of side 30' (below U-shaped depression 32') contains an indentation or recess 28'. For reasons of clarity, it should be noted that in this particular embodiment a section of bus duct housing is formed by assembling a second extruded section 12' to the section 12' shown in FIG. 2. More specifically, one section 12' is turned upside down so that the protrusion 26' of it projects into the recess or indentation 28' of the other. The combination may be secured together by any suitable means, as an example by bonding the sections together with a thermosetting resin, such as an epoxy resin disposed in the depressions 28' and over the protrusion 26'. When the two sections 12' are assembled together to enclose the bus bars 14, the epoxy will cure in place to act both as securing means and as a seal.

In a modified form of the invention, the protrusion 26' may be made slightly larger than the indentation 28' so that when the two sections 12' are joined, the ductile aluminum protrusion 26' forms a press fit with the indentation 28'.

Figure 3:
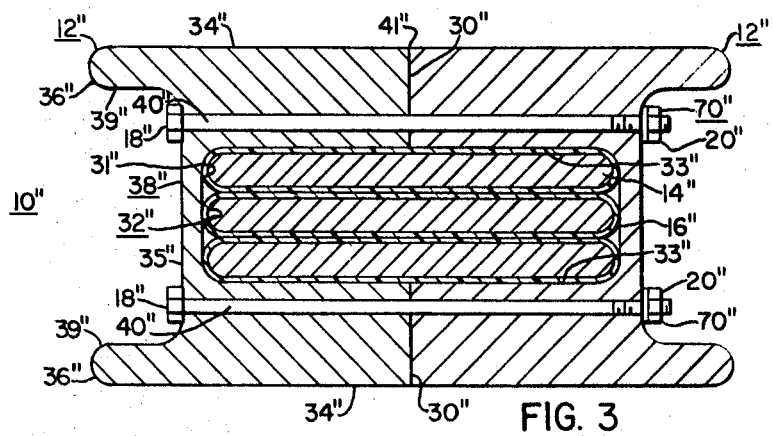
FIG. 3 is a sectional view of a modified form of the invention similar to FIG. 1 differing only in the orientation of the bus bars with respect to the extruded aluminum housing section and the relative sizes of each housing member.

Referring to FIG. 3 the orientation of the housing member 12" is generally similar to that of housing member 12 in FIG. 1, but the positions of the bus bars 14" are generally perpendicular to the positions of the bus bars 14 in FIG. 1. Viewing the left housing member 12", the side 30" of each housing member 12" includes a generally U-shaped recess 32" having a bottom portion 31" and end portions 33". The side 30" is generally perpendicular to an oppositely disposed pair of sides or edges 34" which in turn terminate at the connecting segments or portions 36". Connecting segments 36" then terminate at the end portions 39" of the generally U-shaped depression 38" which is on the other side of each housing member 12" from U-shaped depressions 32". Securing means 70" consisting of bolt 18" and nut 20" mounted near the top and bottom housing section 12" through openings or holes 40". As indicated previously, an important difference between the bus duct structure of FIG. 3 and that of FIG. 1 is the orientation of bus bars 14" within said housing members 10". In this case bus bars 14" and their corresponding insulation 16" are rotated 90° with respect to the position of the bus bar 14 in FIG. 1 and oriented in that relationship within bus duct housing 10".

It is to be noted that extra sections of bus bars 14 may be added to housing sections 10 or 10" merely by elongating certain portions of the housing section. For example, an additional set of three generally parallel bus bars could be added to the structure 10 of FIG. 1 merely by lengthening or widening the edges 34 and end portions 33 of the generally U-shaped depression 32. Similarly, other bus bar 14 can be stacked vertically in the bus duct housing 10" by lengthening the bottom portion 31" of the U-shaped depression 32" and bottom portion 35" of the U-shaped depression 38". Of course the securing means 70 or 70" may have to be elongated in some instances to correspond.

The insulation 16 on bus bar 14 may be changed in size and material as desired and need not necessarily be uniform throughout any set of bus bars 14.

Referring to FIG. 1b, a combination of individually insulated bus bars 114 may be further insulated with extra layers 115 of insulation encircling the entire combination of bus bars. This is especially useful for stacking multiple runs of bus bars in the same housing 10 or 10".

Referring to FIGS. 4 and 5, another embodiment of the invention using extruded aluminum sections to totally enclose bus bars is shown. Referring first to FIG. 4 the bottom extruded aluminum housing section 155 shown is generally E-shaped. The housing section 155 includes end portions or protrusions 142a and 142b and middle section 146. Protrusions 146 and 142a and 142b form slots 150a and 150b between the respective protrusions and the middle portion 146. In these slots 150a and 150b are mounted or disposed sheet metal aluminum housing sides 148a and 148b, respectively. These housing sides enclose the electrically insulated aluminum or copper bus bars 14.

With respect to FIG. 5 it should be noted that extruded aluminum section 55 differs from the aluminum housing section 155 as shown in FIG. 4. In particular, although the side sections 42a and 42b and middle section 46 which form the generally E-shaped housing section 55 include the slots 50a and 50b between the respective portions of the housing section 55, similar to 155 the back portion 49 of the aluminum section 55 is elongated in comparison with the corresponding portion 149 of the aluminum section 155 shown in FIG. 4 providing more surface area and an increase in the structural strength for the extruded aluminum section 55. It will be noted that two aluminum sheet housing sides 48a and 48b are fitted into the slots 50a and 50b, respectively, and joined to the extruded aluminum section 55 by securing means 70''' consisting of a bolt 18''' mounted in a hole 40''' and secured by a nut 20''' in similar fashion to the securing means shown in FIGS. 1 and 3. This is done on both top and bottom to form bus duct housing 11.

With respect to the insert view in FIG. 5 it will be noted that as a securing bolt 20''' is tightened, the protrusion or section 42b (42a not shown) is bent toward the middle protrusion 46 of the housing section 55. As protrusion 42a bends it forces the vertical sheet metal aluminum housing side 48a in toward middle section 46. It will be noted that middle section 46 has been cambered or tapered as indicated by 52 to allow a substantially flat fit between middle section 46 and bent sheet metal sections 48 when full compression has been achieved. The effect of this full compression is to place sufficient pressure on the insulated bus bars 14 as shown in FIG. 5 to insure a good physical contact for heat-transferring engagement between aluminum sections 48a and 48b and insulation 16 on the bus bar 14. It also makes a better seal between all the parts of the overall housing.

The entire housing in FIG. 5 is therefore composed of four sections or two pairs of aluminum housing sections. One pair comprises oppositely disposed extruded aluminum sections 55 and the other pair comprises oppositely disposed aluminum sheet sides 48a and 48b. The two pairs of aluminum sections are joined together by securing means 70''' as previously described.

Referring to FIG. 6 and similarly to the arrangements described with respect to FIGS. 1 and 3 a housing 211 of the type shown in FIG. 5 can be extended in a vertical direction merely by lengthening aluminum sides 248a and 248b and by adding a series of vertically spaced securing means 270, each of which is disposed within an electrically insulating structure or tubular member 250; bottom and top section 255 is the same as sections 55 in FIG. 5. This forms a number of hollow compartments or chambers 257 into which a plurality of vertically spaced sections of bus bars 214 can be disposed thus permitting the housing of several separate runs of bus bars.

In addition, the bus bars 14 shown in FIG. 5 can be rotated 90° in a manner similar to that shown in FIG. 3 and enclosed by the type of housing shown in either FIG. 5 or FIG. 6.

It is to be understood that although the invention generally is described in terms of aluminum housing sections, any aluminum base alloy can be used for either the extruded housing sections such as 12, 12′, 12″, 55, 155, 255 or the sheet metal sections 48a and 48b. In addition, the securing means such as bolts 18 and the nuts 20 may be aluminum or steel or any metal suitable for both securing housing sections and conducting heat or providing rigidity where desired or necessary.

The apparatus embodying the teachings of this invention has several advantages. For example, a simple completely enclosed entirely aluminum bus duct which is a good conductor of heat and made rigid by using members with strong extruded shapes can be produced. Because it is completely enclosed, it protects conductors or bus bars from dirt and corrosive environment and in addition protects nearby personnel from electrical shock.

Since numerous changes may be made in the above-described apparatus and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. A section of bus duct comprising a housing, and a section of a plurality of bus bars means supported in said housing, said section of bus duct comprising a main body part intermediate to the ends thereof, said housing of said main body part of said section of bus duct comprising a housing means comprising a generally congruent pair of oppositely disposed generally I-shaped housing members.

2. A section of bus duct according to claim 1, said I-shaped housing members being secured together by fastening means which extend transversely with respect to said I-shaped housing means.

3. A section of bus duct according to claim 1, wherein each of said housing members includes a first pair of oppositely disposed generally parallel sides, a third side generally perpendicular to and joining said first pair of sides, said third side including a generally U-shaped depression formed into it and large enough to accommodate at least a portion of said bus bar means, opening outwardly in a first direction and terminating at said third side, a fourth side comprising a second generally U-shaped depression opening outwardly in a second direction which is generally opposite to said first direction, said fourth side being joined on the ends of each leg of said second U-shaped depression to said first pair of sides by connecting segments, said fastening means uniting said housing members with one another such that the third sides of each said housing member is employed in a face-to-face relationship causing contact with and forming an enclosure of said bus bar means by said housing means, said bus bar means comprising a plurality of flat bus bars, said bus bars being positioned in a mutually flatwise, face-to-face relationship in the U-shaped depressions of said housing members, the remainder of the said third side of each member other than the U-shaped depression being positioned approximate to the remainder of the other said third side in such a manner as to allow for variations of pressure on said insulating bus bars as the securing means is adjusted.

4. A section of bus duct according to claim 3 wherein said individual housing members are formed from a heat-conducting metallic material for dissipation of heat from said bus bars and for structural strength.

5. A section of bus duct according to claim 4, wherein said housing members are formed primarily from aluminum for efficient dissipation of heat from said bus bars.

6. A section of bus duct according to claim 5, wherein the surface of each of said housing members contains a plurality of surface undulations adding more surface area to the housing member to thereby facilitate the removal of more heat from said housing members.

7. A section of bus duct according to claim 6, wherein said housing members include interlocking means to facilitate the joining of both members and to aid in completely enclosing the bus bars.

8. A section of bus duct comprising a housing, a plurality of bus bar means supported by said housing, said section of bus duct comprising a main body part intermediate the ends thereof, said housing of said main body part of said section comprising a housing portion, said housing portion comprising first and second pairs of oppositely disposed aluminum housing members, said first pair of aluminum housing members including slot means to engage said second pair of aluminum housing members, said second pair of aluminum housing members and said first pair of aluminum housing members being joined by securing means to form said housing portions, said second pair of aluminum members being secured to said first pair of members in such a manner as to apply pressure on said bus bar means.

9. A section of bus duct according to claim 8, wherein said housing structure encloses a plurality of spaced openings to accommodate separate sets of bus bars, each set of bus bar means being electrically separated from adjacent sets by an insulating means.

10. A section of bus duct comprising a housing, a plurality of bus bar means supported by said housing, said section of bus duct comprising a main body part intermediate the ends thereof, said housing of said main body part of said section comprising a housing portion, said housing portion comprising first and second pairs of oppositely disposed aluminum housing members, each one of said first pair of aluminum housing members having a generally E-shaped cross-sectional area and including a pair of spaced slots and a pair of end portions, each of said second pair of aluminum housing members being generally rectangular in shape and being disposed in the spaced slots, each of said first pair of housing members including a back portion and including at least one tapered surface adjacent to each slot thereof said first and second pairs of aluminum housing members being joined by securing means in such a manner as to enclose said bus means, said securing means exerting forces against said end portions of said first pair of housing members to thereby compress said end portions and said second pair of aluminum members against said tapered surfaces of said first pair of housing members, said bus means comprising a plurality of generally flat bus bars, said bus bars being positioned in a mutually flatwise face-to-face relationship, said bus bars being contacted by said first and second pairs of aluminum members in such a manner as to apply constricting pressure on said bus bars.

11. A set of bus duct according to claim 10, wherein a housing portion encloses a plurality of sets of bus bars separated from others by insulating means.

12. A section of bus duct according to claim 11, wherein each insulating means comprises a spacer constructed in such a manner as to facilitate using a plurality of securing means in conjunction with spacers to further secure said members and at the same time isolate independent bus bars from others.